US012127680B2

(12) United States Patent
Chang et al.

(10) Patent No.: US 12,127,680 B2
(45) Date of Patent: Oct. 29, 2024

(54) AIR CELL DEVICE AND AIR MATTRESS SYSTEM THEREOF

(71) Applicant: Wellell Inc., New Taipei (TW)

(72) Inventors: Chih-Kuang Chang, New Taipei (TW); Sheng-Wei Lin, New Taipei (TW); Chin-Chang Lin, New Taipei (TW); Yue-Yin Chao, New Taipei (TW); Yu-Hao Chen, New Taipei (TW)

(73) Assignee: WELLELL INC., New Taipei (TW)

( * ) Notice: Subject to any disclaimer, the term of this patent is extended or adjusted under 35 U.S.C. 154(b) by 169 days.

(21) Appl. No.: 17/672,061

(22) Filed: Feb. 15, 2022

(65) Prior Publication Data

US 2022/0265058 A1 Aug. 25, 2022

Related U.S. Application Data

(60) Provisional application No. 63/153,574, filed on Feb. 25, 2021.

(51) Int. Cl.

| | |
|---|---|
| ***A47C 27/08*** | (2006.01) |
| ***A47C 27/10*** | (2006.01) |
| ***A61G 7/057*** | (2006.01) |

(52) U.S. Cl.
CPC ............ *A47C 27/082* (2013.01); *A47C 27/08* (2013.01); *A47C 27/087* (2013.01); *A47C 27/10* (2013.01);
(Continued)

(58) Field of Classification Search
CPC ............ A61G 7/05753; A61G 7/05761; A61G 7/05792; A61G 7/05784; A61G 7/05776; A61G 7/05769; A61G 7/05746; A61G 7/05723; A61G 2203/34; A61G 5/1045; A61G 13/1265; A47C 27/18; A47C 27/088; A47C 27/128; A47C 27/10; A47C 27/084; A47C 27/083; A47C 27/081; A47C 27/08; A47C 7/021; A47C 20/048; A47C 17/80; A47C 20/025; A47C 21/044; A47C 7/029; A47C 7/14; A47C 21/006; A47C 21/046; A47C 23/047; A47C 31/123; A47C 4/54; A47C 7/425; Y10S 297/03; B60N 2/5621;
(Continued)

(56) References Cited

U.S. PATENT DOCUMENTS

| | | | | |
|---|---|---|---|---|
| 2,604,641 A * | 7/1952 | Reed | .................... | A47C 27/087 5/710 |
| 5,802,645 A * | 9/1998 | Vrzalik | .................. | A61G 7/001 5/710 |

(Continued)

FOREIGN PATENT DOCUMENTS

| | | | |
|---|---|---|---|
| WO | WO-0100059 A2 * | 1/2001 | ........... A47C 20/025 |
| WO | WO-2013014947 A1 * | 1/2013 | ........... A47C 27/082 |

*Primary Examiner* — David R Hare
*Assistant Examiner* — Deborah Talitha Gedeon
(74) *Attorney, Agent, or Firm* — WPAT, P.C

(57) ABSTRACT

Provided are an air cell device and an air mattress system thereof. The air cell device includes an air cell which has therein an upper connection segment and a lower connection segment. The upper connection segment and the lower connection segment each have a curved portion whereby the air cell is partitioned to become a multilayered air cell so as to mitigate air cell bending or air cell inversion, thereby improving the lying human being's comfort.

11 Claims, 10 Drawing Sheets

(52) U.S. Cl.
CPC ...... *A61G 7/05769* (2013.01); *A61G 7/05776* (2013.01)

(58) Field of Classification Search
CPC . B60N 2/665; A47G 2009/003; A47G 9/1027
See application file for complete search history.

(56) References Cited

U.S. PATENT DOCUMENTS

| | | | | | |
|---|---|---|---|---|---|
| 5,918,336 | A * | 7/1999 | Lee | A61G 7/05776 | |
| | | | | 5/713 | |
| 9,655,457 | B2 * | 5/2017 | Meyer | A47C 27/088 | |
| 10,112,513 | B2 * | 10/2018 | Patrick | B60N 2/5621 | |
| 2005/0114998 | A1 * | 6/2005 | Leventhal | A47C 20/048 | |
| | | | | 5/615 | |
| 2012/0317727 | A1 * | 12/2012 | Tanaka | A61G 7/057 | |
| | | | | 5/710 | |
| 2020/0078241 | A1 * | 3/2020 | Chang | A47C 27/082 | |

* cited by examiner

AIR CELL DEVICE AND AIR MATTRESS SYSTEM THEREOF

CROSS REFERENCE TO RELATED APPLICATION

The present application claims priority to U.S. Provisional Patent Application No. 63/153,574 filed on Feb. 25, 2021, the entire content of which is incorporated by reference to this application.

BACKGROUND OF THE INVENTION

Field of the Invention

The present disclosure relates to air cell devices and air mattress systems thereof and, more particularly, to an air cell device and an air mattress system thereof, wherein the air mattress system is not only well-aligned but also inflated and deflated under coordinated control.

Description of the Prior Art

Conventional narrow-cell, single-cell air cells assembled together to form air mattresses are designed to be narrow in order to maximum their contact area with a user's body. However, the height of air cells is correlated with the overall thickness of the assembled air mattress, and thus the air cells must be sufficiently high. Thus, compared with wide air mattress single air cells, narrow, high narrow-cell single-cell air cells not only have insufficient internal pressure for providing sufficient support but are also likely to undergo air cell inversion and/or air cell bending. Therefore, there is room for improvement in the air cell device of the air mattress in terms of single-cell air cell design and multi-air cell internal pressure matching.

SUMMARY OF THE INVENTION

It is an objective of the present disclosure to ensure that a single-cell air cell device is unlikely to undergo air cell bending or air cell inversion while bearing weight.

In order to achieve the above and other objectives, the present disclosure provides an air cell device comprising an air cell and an air transfer unit. The air cell, when inflated, includes an air cell wall, two long sides defined by the air cell wall, two short sides defined by the air cell wall, and two height sides defined by the air cell wall. The air cell wall has a left air cell wall and a right air cell wall which are defined on two sides of the long sides. The air cell has an upper connection segment and a lower connection segment which are formed by joining of the left air cell wall and the right air cell wall and extended along the long-side direction. The upper connection segment and the lower connection segment each have at least one curved portion. The air transfer unit is in fluid communication with an inside of the air cell and an outside of the air cell to transfer air.

In an embodiment of the present disclosure, the curved portions of the upper connection segment and the lower connection segment cross each other in a direction perpendicular to the long sides, and centers of the two curved portions crossing each other are separated by a horizontal distance in a direction parallel to the long sides.

In an embodiment of the present disclosure, the curved portions are raised upward or dented downward by a deviation distance, wherein the upper connection segment and the lower connection segment allow the inside of the air cell to be partitioned into three air chambers extending along the long-side direction, wherein the deviation distance does not exceed ½ of the height of any one of the air chambers.

In an embodiment of the present disclosure, the length of the short sides of the air cell device is not greater than 6 cm.

In an embodiment of the present disclosure, the upper connection segment comprises an upper opening formed by the left air cell wall and the right air cell wall not being joined at part of the upper connection segment, wherein the upper connection segment and the lower connection segment allow the inside of the air cell to be partitioned into three air chambers extending along the long-side direction, wherein two air chambers adjacent to at the upper connection segment can be in fluid communication with each other through the upper opening.

In an embodiment of the present disclosure, the lower connection segment comprises a lower opening formed by the left air cell wall and the right air cell wall not being joined at part of the lower connection segment, wherein the upper connection segment and the lower connection segment allow the inside of the air cell to be partitioned into three air chambers extending along the long-side direction, wherein the three air chambers can be in fluid communication with each other through the upper opening and the lower opening.

In an embodiment of the present disclosure, the upper connection segment has a protrusion portion connected to each height side and adapted to decrease the distance between the upper connection segment and the long side at the top of the air cell but increase the distance between the upper connection segment and the lower connection segment.

In an embodiment of the present disclosure, the air cell has two additional connection segments formed by joining of the left air cell wall and the right air cell wall, connected to the two height sides, and disposed above the upper connection segment.

In an embodiment of the present disclosure, the upper connection segment has a first upper connection segment and a second upper connection segment, and an structurally-weakened region formed by the left air cell wall and the right air cell wall not being joined is disposed between the first upper connection segment and the second upper connection segment, wherein at least one air hollowed-out region formed by the joining of the left air cell wall and the right air cell wall is defined at a part of the structurally-weakened region.

In order to achieve the above and other objectives, the present disclosure provides an air mattress system comprising a plurality of air cell devices arranged along the lengthwise direction of the air mattress to at least support a lying human being's head region, shoulder regions, back region, buttock regions, thigh regions and leg regions, wherein deflation of part of the air cell devices are controlled to be independent of the other air cell devices.

In an embodiment of the present disclosure, in the air cell device positioned proximate to the head region and the shoulder regions, the upper connection segment has a first upper connection segment and a second upper connection segment, and an structurally-weakened region formed by the left air cell wall and the right air cell wall not being joined is disposed between the first upper connection segment and the second upper connection segment, wherein at least one air hollowed-out region formed by the joining of the left air cell wall and the right air cell wall is defined at a part of the structurally-weakened region.

Therefore, the air cell device provided according to embodiments of the present disclosure has some advantageous technical features as follows: an upper connection segment and a lower connection segment are formed by joining a left air cell wall and a right air cell wall of an air cell; curved portions are formed on the upper connection segment and the lower connection segment; and thus the air cell device bears a weight evenly. Therefore, the present disclosure is effective in mitigating air cell bending or air cell inversion, thereby improving the lying human being's comfort.

DETAILED DESCRIPTION OF THE EMBODIMENTS

Objectives, features, and advantages of the present disclosure are hereunder illustrated with specific embodiments, depicted with drawings, and described below.

In the disclosure, descriptive terms such as "include, comprise, have" or other similar terms are not for merely limiting the essential elements listed in the disclosure, but can include other elements that are not explicitly listed and are however usually inherent in the units, components, mattresses, air cells, structures, devices, systems, portions or regions.

In the disclosure, the terms similar to ordinals such as "first" or "second" described are for distinguishing or referring to associated identical or similar components or structures, and do not necessarily imply the orders of these components, structures, portions or regions in a spatial aspect. It should be understood that, in some situations or configurations, the ordinal terms could be interchangeably used without affecting the implementation of the present invention.

In the disclosure, descriptive terms such as "a" or "one" are used to describe the unit, component, mattress, air cell, structure, device, system, portion or region, and are for illustration purposes and providing generic meaning to the scope of the present invention. Therefore, unless otherwise explicitly specified, such description should be understood as including one or at least one, and a singular number also includes a plural number.

Figure 1:
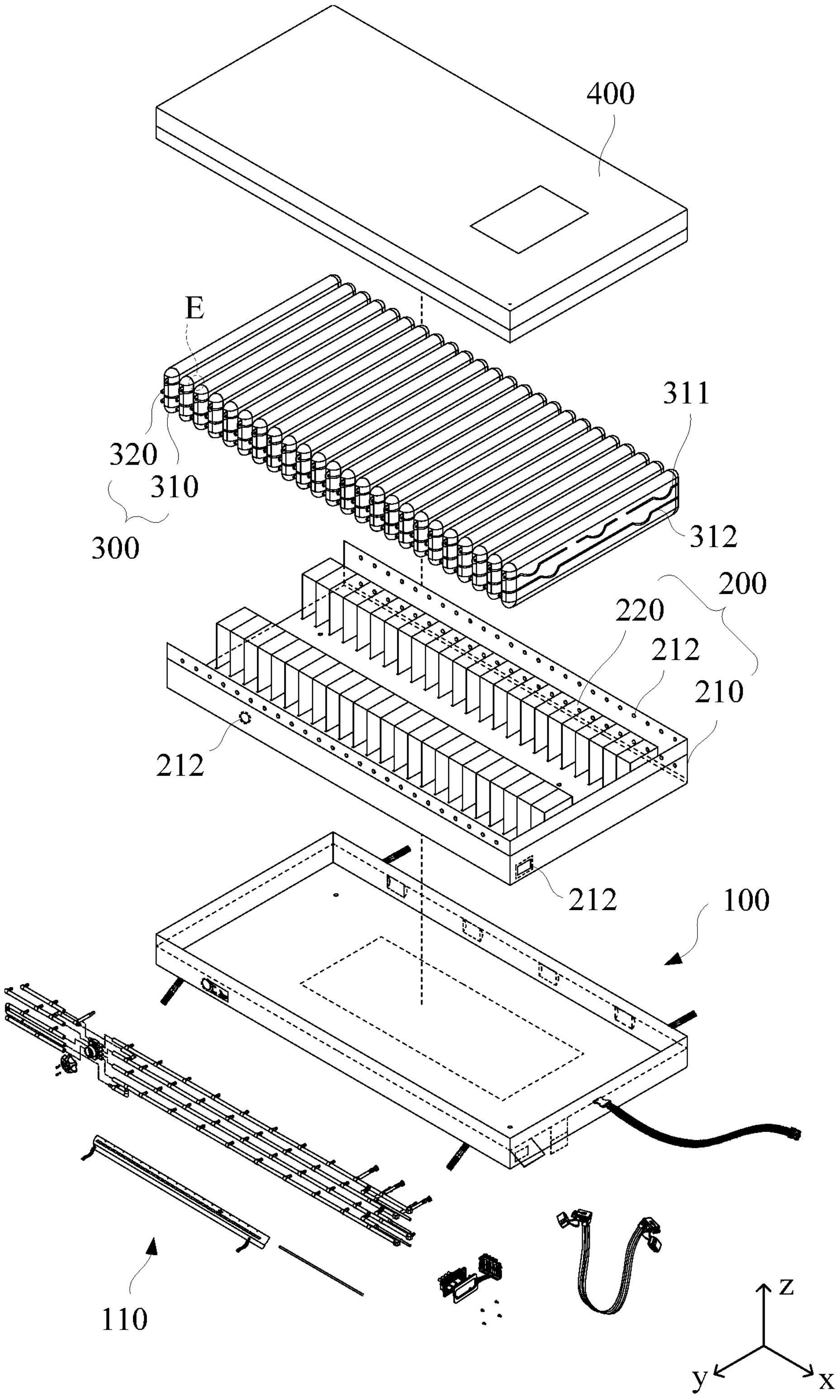
FIG. 1 is an exploded view of an air mattress system according to an embodiment of the present disclosure.

FIG. 1 is an exploded view of an air mattress system according to an embodiment of the present disclosure. The air mattress system comprises a bottom frame 100, an inner bottom cover 200, a plurality of air cell devices 300 and an outer cover 400.

The bottom frame 100 supports the inner bottom cover 200. The inner bottom cover 200 comprises a base 210, a plurality of through-holes 212 and a limiting portion 220. The through-holes 212 are defined on the lateral side of the inner bottom cover 200 so as to be penetrable by pipeline components 110 to allow the pipeline components 110 to be connected to the air cell devices 300, respectively.

The limiting portion 220 provides a position-limitation function to the air cell devices 300 to align the air cell devices 300 along the lengthwise direction of the air mattress.

After the air cell devices 300 have been fitted to the limiting portion 220, the outer cover 400 covers the air mattress from above, so as to form a comfortable bed for a lying human being.

The air cell devices 300 support a lying human being's head region, shoulder regions, back region, buttock regions, thigh regions and leg regions. The length and height of the air cell devices assembled together to form an air mattress may not be equal; for example, the air cell devices are high in the head region, low in the leg regions, but long in the shoulder regions, back region, and buttock regions; these technical features, however, are not restrictive of the embodiments and drawings of the present disclosure.

The air cell devices 300 are arranged in a narrow-cell manner (i.e., in a width-reducing manner) to increase the contact area between the lying human body and the air cell devices 300 and thereby reducing gaps E formed between the bulging air cell devices 300 aligned, so as to improve the lying human being's comfort.

In this embodiment, each air cell device 300 shown in FIG. 1 comprises an air cell 310 and an air transfer unit 320. FIG. 1 shows that one air cell device 300 comprises an air transfer unit 320 with two air transfer components. The air cell 310 comprises an upper connection segment 311 and a lower connection segment 312. The upper and lower connection segments 311, 312 are located at junctions of air cell walls (joined or sealed by high-frequency welding/sealing or the like) of the air cell 310, respectively. The upper connection segment 311 is closer to the lying human body than the lower connection segment 312. Thus, the upper connection segment 311 is closer to the top of the air mattress system than the lower connection segment 312.

The upper connection segment 311 and lower connection segment 312 partition the inside of the air cell 310 into air chambers. Owing to the upper and lower connection segments 311, 312, the air cell 310 is multilayered to confine air to a specific region temporarily or continuously or constrain the route of free flow of air, so as to provide the support required for mitigation of air cell bending or air cell inversion and thus preclude single-cell air cell bending or inversion, thereby further improving the lying human being's comfort.

The air cell wall of each air cell 310 undergoes high-frequency welding/sealing or the like, such that air chambers are formed inside each air cell 310. The air chambers inside each air cell 310 are either partially in fluid communication with each other or not in fluid communication with each other. The air chambers are supplied with air from the air transfer unit 320 connected to an external air supply device or the like.

Figure 2:
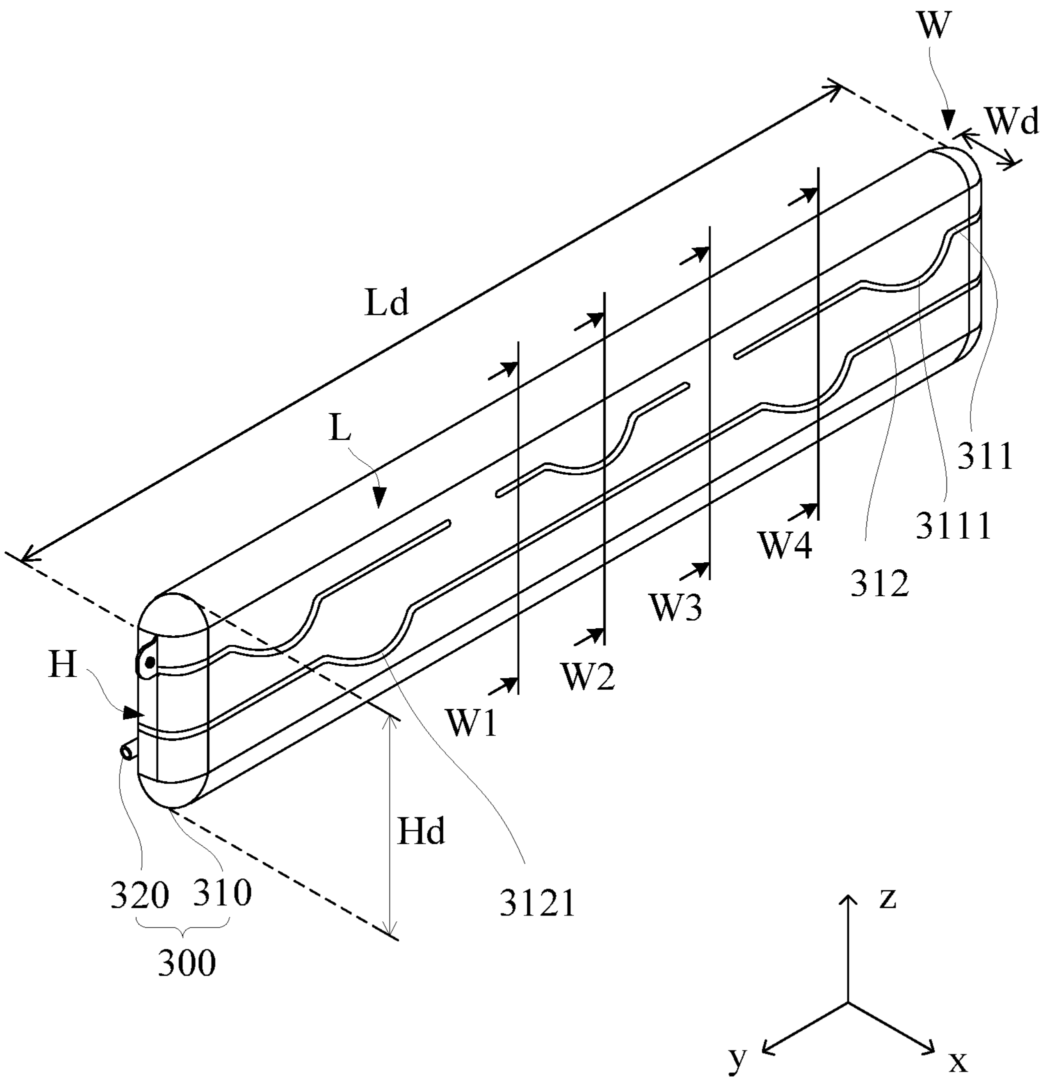
FIG. 2 is a perspective view of an air cell device according to an embodiment of the present disclosure.
Figure 14:
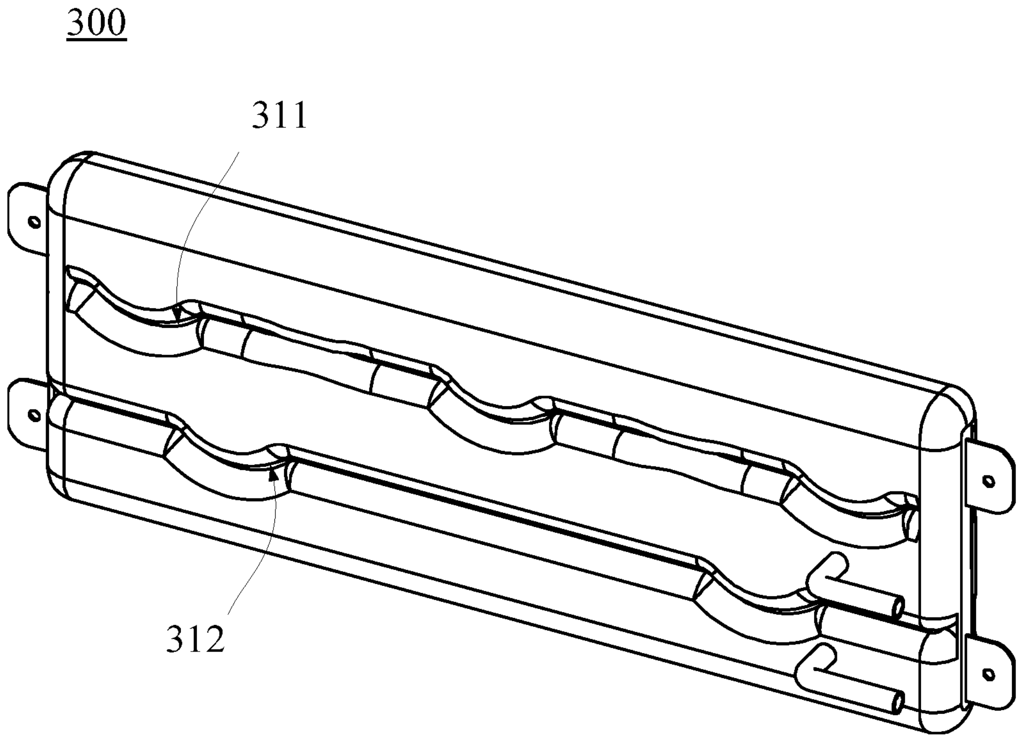
FIG. 14 is a perspective view of the air cell device according to an embodiment of the present disclosure.
Figure 15:
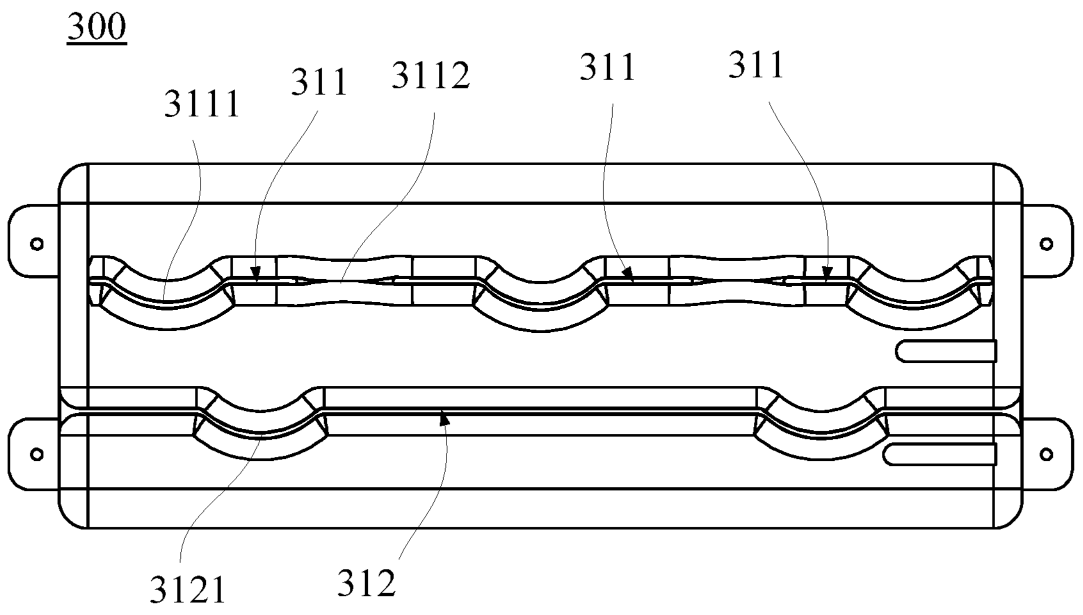
FIG. 15 is a front view of the air cell device of FIG. 14.
Figure 16:
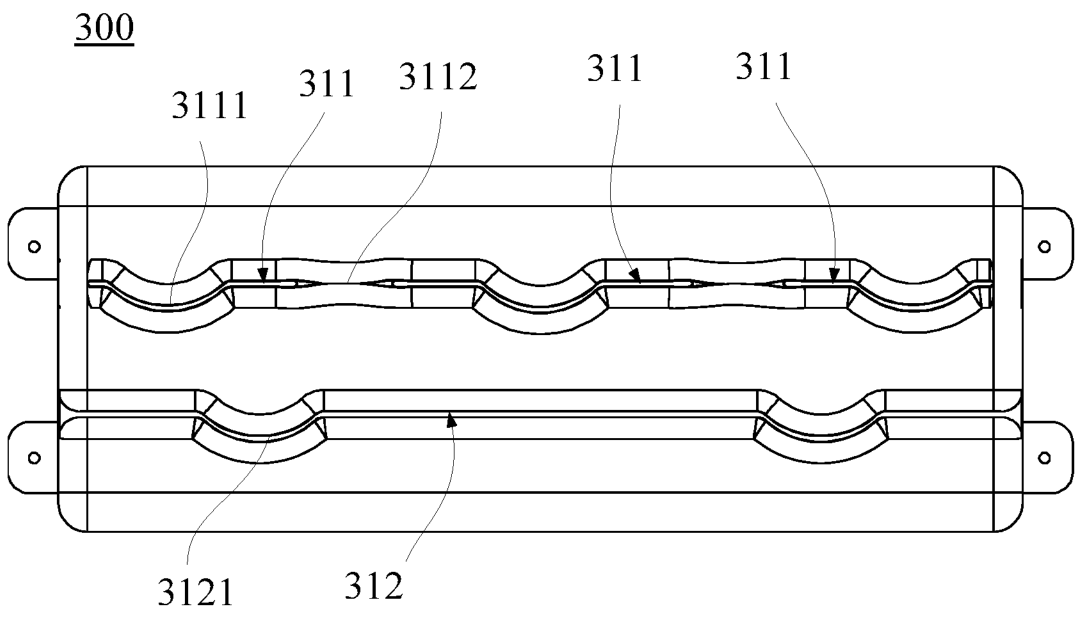
FIG. 16 is a rear view of the air cell device of FIG. 14.

FIG. 2 further illustrates the air cell device. For the sake of illustration, FIG. 1 and FIG. 2 show that the locations of the upper connection segment 311 and the lower connection segment 312 of the air cell device 300, left air cell wall and the right air cell wall at the upper connecting section 311 and the lower connecting section 312 in FIGS. 1 and 2 are not in the joined state. FIGS. 14-16 show that the left air cell wall and the right air cell wall at the upper connection segment 311 and the lower connection segment 312 are in the joined state, and the air cell device 300 is in inflated state.

As shown in the diagrams, after the air cell 310 has been inflated, the air cell wall of the air cell 310 defines two long sides L, two short sides W and two height sides H. The length of the long sides L is denoted by Ld. The upper and lower long sides L are of equal length (as shown in FIG. 2) or unequal length. The length of the short sides W is denoted by Wd. The length of the height sides H is denoted by Hd. The length Wd of the short sides W of the air cell devices 300 is preferably 6 cm or less. For the sake of illustration, as shown in the diagram, the short sides W of the air cell 310 extend in the lengthwise direction of the air mattress, that is, x-axis direction, the long sides L of the air cell 310 extend in the widthwise direction of the air mattress, that is, y-axis direction, and the height sides H of the air cell 310 extend in the thickness direction of the air mattress, that is, z-axis direction.

Figure 3:
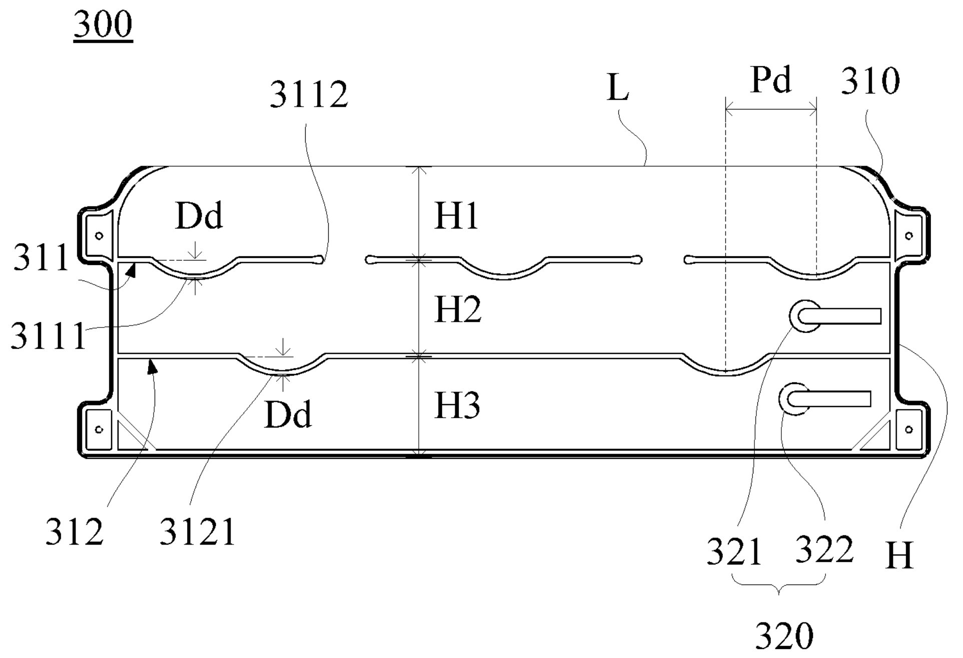
FIG. 3 is a cross-sectional view of the air cell device taken along a long-side direction according to an embodiment of the present disclosure.
Figure 4:
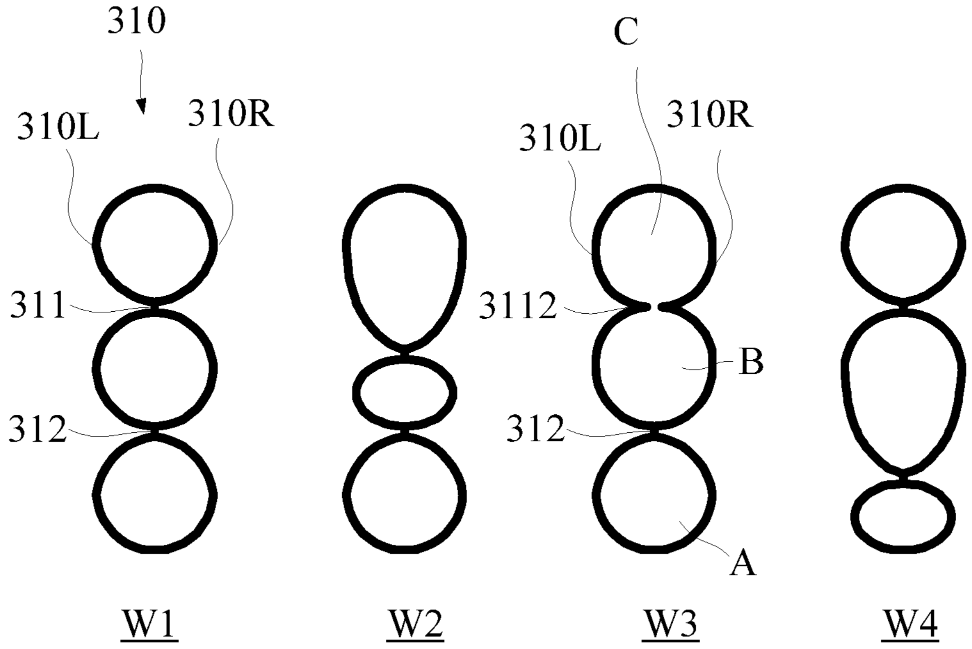
FIG. 4 is cross-sectional views of air cells taken along different cross-sectional lines based on FIG. 2.

FIG. 3 is a cross-sectional view of the air cell device 300 taken along a long-side direction (y-axis direction) according to an embodiment of the present disclosure. FIG. 4 depicts an air cell device of FIG. 1. Take the air cell of FIG. 2 as an example, FIG. 3 is a cross-sectional view of the air cell device taken along the lengthwise direction (x-axis direction) of the short sides W and at positions W1, W2, W3, W4.

Referring to FIG. 4, there are shown cross-sectional views taken along the short sides W (z-axis direction) and at different positions along the long-side direction (y-axis direction), and viewed from the lateral side of the air cell device 300. The air cell wall of the air cell 310 has a left air cell wall 310L and a right air cell wall 310R which flank the long sides. The air cell 310 has an upper connection segment 311 and lower connection segment 312 formed by joining the left air cell wall 310L and the right air cell wall 310R and extended along the long-side direction.

As shown in FIG. 4, the air cell walls of the air cell 310 are joined, and the extension of the connection segments 311, 312 allows the internal space of the air cell 310 to be partitioned into three air chambers, namely upper, middle and lower ones.

As shown in FIG. 3, the connection segments 311, 312 each have at least one curved portion extending in the direction of the long sides L by arranging the positions where the left air cell wall and the right air cell wall to be joined. Referring to FIG. 3 and FIG. 4, the upper connection segment 311 has three curved portions 3111, whereas the lower connection segment 312 has two curved portions 3121. The curved portions 3111 on the connection segments 311, 312 have arcuate outlines and thus can provide a supporting force to the air cell device. Furthermore, the arcuate outlines of the curved portions 3111 spread the air cell bending force (under which the air cell device bends laterally) generated as a result of a weight imposed on the top surface of the air cell device, thereby further precluding air cell bending.

Referring to FIG. 3, the curved portions 3111, 3121 at the upper connection segment 311 and lower connection segment 312 cross each other in the direction perpendicular to the long sides L. The centers of the two curved portions 3111, 3121 which cross each other are separated by a horizontal distance Pd in the direction parallel to the long sides L. The horizontal distance Pd enables the curved portions 3111, 3121 to be positioned asymmetrical to each other.

The connection segments are arcuate. When the air cell is inflated, arcuate curved surfaces of the connection segments generate further support forces to further prevent air cell bending. The arcuate curved surfaces are located in a horizontal direction (in the direction of the long sides L, i.e., the y direction shown in FIG. 2) or a vertical direction (in the direction of the height sides H, i.e., the z direction shown in FIG. 2). When the arcuate curved surfaces are located in the vertical direction, the curved line on the upper layer and the curved line on the lower layer are separated by a horizontal distance to make them cross each other, so as to average the width ratio of the upper layer and lower layer of the air cell, in the same way as the aforesaid horizontal distance Pd which renders the curved portions asymmetrically positioned.

As shown in FIG. 3, the curved portions 3111, 3121 each dent downwards in the middle by a deviation distance Dd. The upper connection segment 311 and lower connection segment 312 allow the inside of the air cell 310 to be partitioned into three air chambers which extend in the direction of the long sides L. The air chambers have heights H1, H2, H3, respectively. The deviation distance Dd does not exceed ½ of the height of any one of the air chambers, that is, $Dd \leq (1/2)H1$, $Dd \leq (1/2)H2$, $Dd \leq (1/2)H3$. The air chamber heights H1, H2, H3 do not involve the curved portions 3111, 3121.

As shown in FIG. 3, the upper connection segment 311 comprises an upper opening 3112. Owing to the upper opening 3112, the left air cell wall 310L and right air cell wall 310R are not joined at part of the upper connection segment 311 to provide an air channel. Referring to FIG. 4, the left air cell wall 310L and right air cell wall 310R are not joined at the upper connection segment 311 along the cross-sectional line of W3. Thus, the air chambers of the two air cells B, C which meet at the upper connection segment 311 are in fluid communication with each other but are insulated from the air chamber of the air cell A. Therefore, although the air cell C does not come with the air transfer unit 320, air can be transferred between the air channel and the air cell B to effectuate inflation and deflation.

As shown in FIG. 4, every layer of the single cell reflects the area of cross-sections, whether the curved portions 311, 312 are included or not. The curved portions 311, 312 which cross each other ensure that no cross-section includes two or more large air chambers or two or more small air chambers and thus optimize the mitigation of air cell inversion and air cell bending by the single cell in this embodiment. Given the W1 cross-sectional line, all the three air chambers are of medium size (equal). Given the W2 cross-sectional line, the three air chambers are medium-sized, small-sized and large-sized from bottom to top. Given the W3 cross-sectional line, all the three air chambers are of medium size (equal). Given the W4 cross-sectional line, the three air chambers are small-sized, large-sized and medium-sized from bottom to top.

Figure 5:
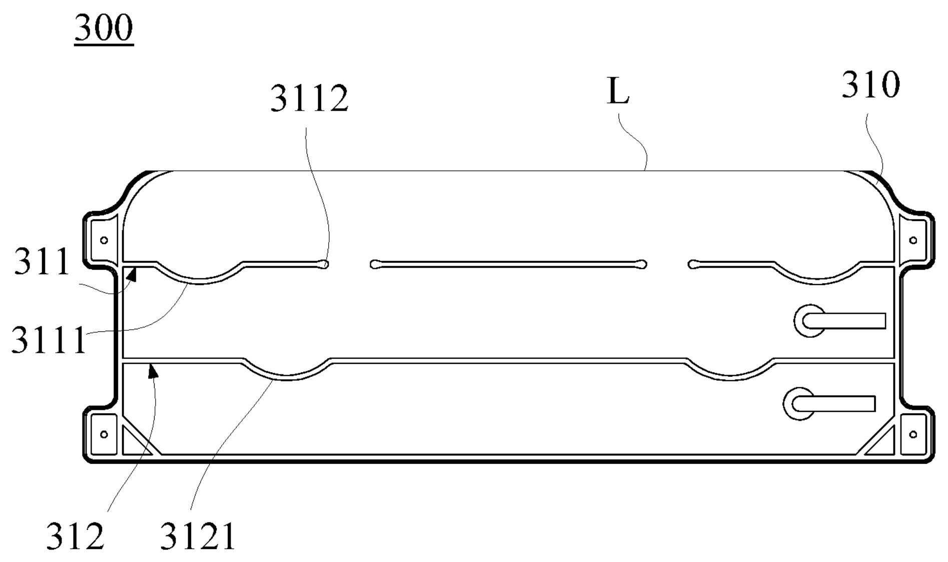
FIG. 5 is a cross-sectional view of the air cell device with different curved portions, taken along a long-side direction according to an embodiment of the present disclosure.

The air cell device shown in FIG. 5 is similar to those shown in FIG. 2 through FIG. 4 except that the curved portions 3111 of the upper connection segment 311 are in the number of two.

Figure 6:
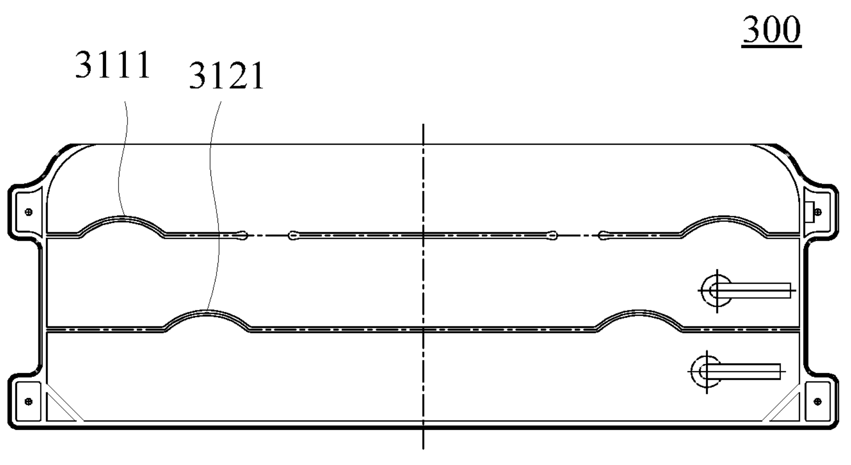
FIG. 6 is a cross-sectional view of the air cell device with an upper connection segment having different opening positions, taken along the long-side direction according to an embodiment of the present disclosure.

As shown in FIG. 6, the curved portions 3111, 3121 are raised upward in the middle. In another embodiment, both a curved portion raised upward and a curved portion dented downward are provided.

Figure 7:
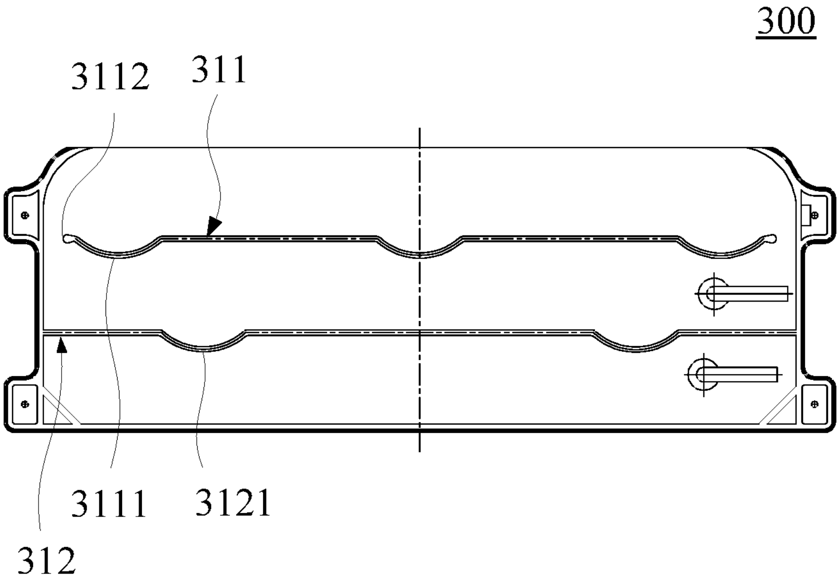
FIG. 7 is a cross-sectional view of the air cell device with the connection segments each having opening positions, taken along the long-side direction according to an embodiment of the present disclosure.

As shown in FIG. 7, the upper connection segment 311 may open at any positions. For instance, the upper opening 3112 is defined at the two ends of the upper connection segment 311. Furthermore, the number of the curved portion is subject to changes.

Figure 8:
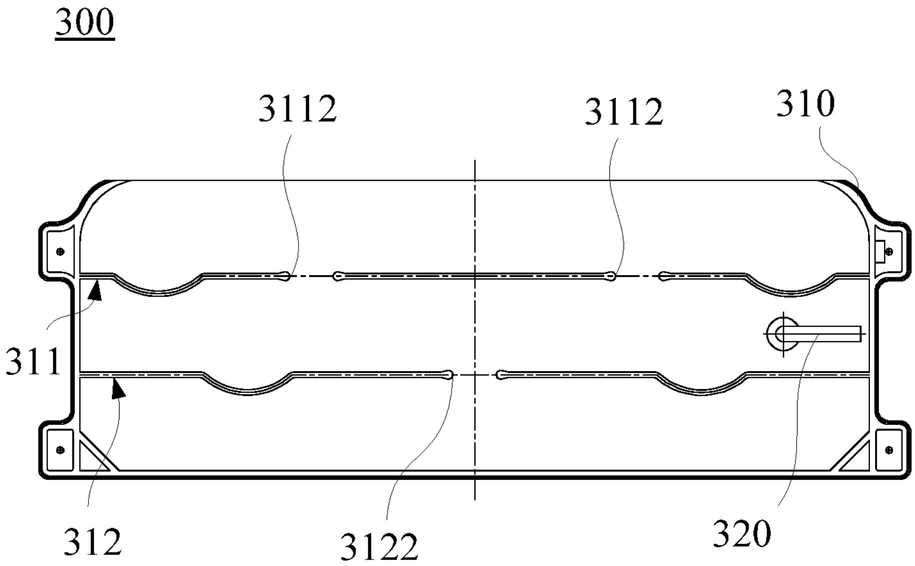
FIG. 8 is a cross-sectional view of the air cell device taken along the long-side direction according to another embodiment of the present disclosure.

As shown in FIG. 8, the connection segments 311, 312 have openings 3112, 3122; thus, as shown in FIG. 8, the air chambers in the air cell 310 are in fluid communication with each other, and the air transfer unit 320 has only one air transfer component.

Figure 9:
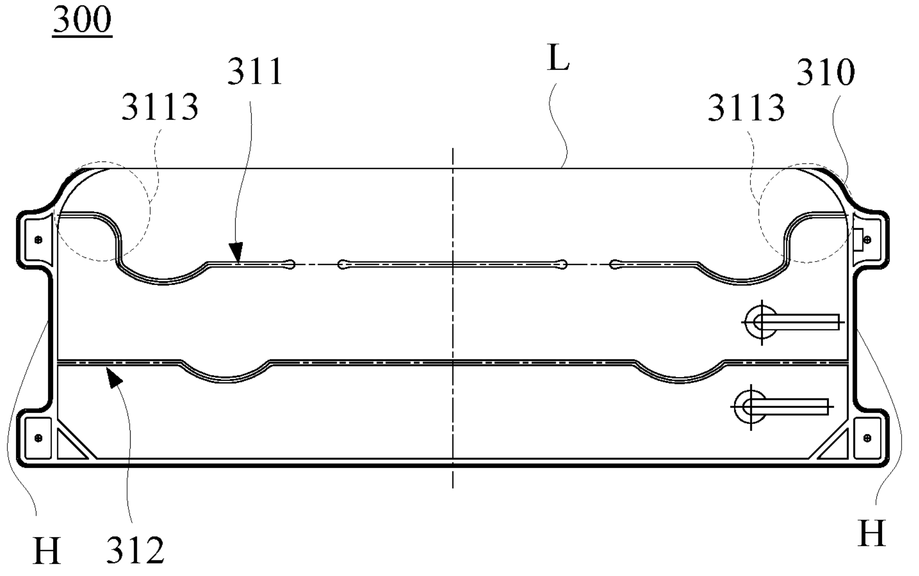
FIG. 9 is a cross-sectional view of the air cell device taken along the long-side direction according to another embodiment of the present disclosure.
Figure 10:
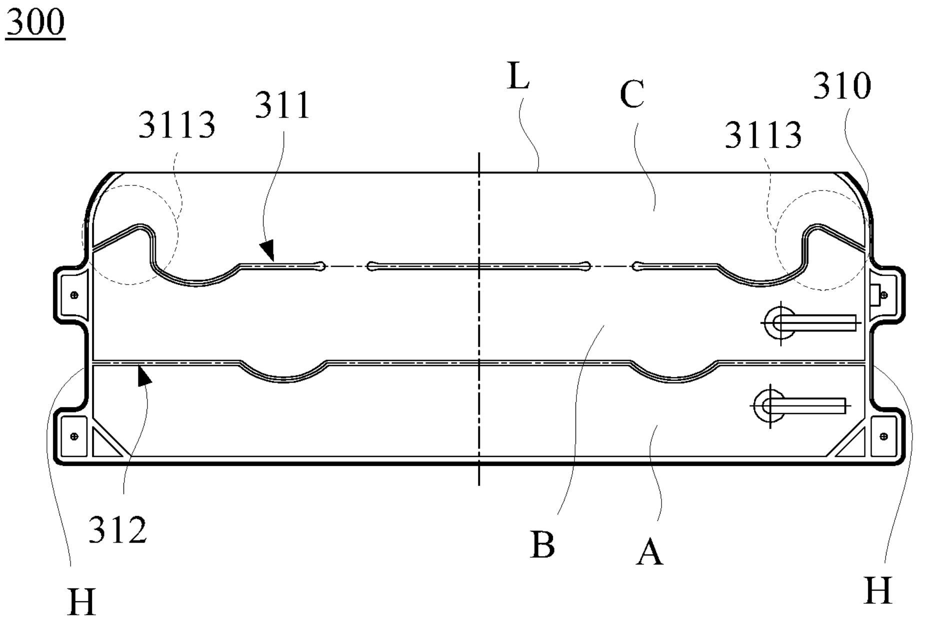
FIG. 10 is a cross-sectional view of the air cell device taken along the long-side direction according to another embodiment of the present disclosure.

As shown in FIGS. 9-10, each upper connection segment 311 has a protrusion portion 3113 disposed at the junction of the upper connection segment 311 and the corresponding one of the height sides H. The protrusion portion 3113 not only decreases the distance between the upper connection segment 311 and the long sides L on top of the air cell 310 but also increases the distance between the upper connection segment 311 and the lower connection segment 312.

FIG. 9 illustrates the connection associated with the two ends of the air cell 310 and corresponding in position to the arcuate edges of the two height sides H of the air cell 310. As shown in the diagram, the connection segments perpendicular to the height sides H each consist of three connection subsegments. The first connection subsegment is parallel to the height sides H and extends upward. The second connection subsegment bends arcuately to extend toward the height sides H. The third connection subsegment is perpendicular to the height sides H and extends toward the height sides H until it connects to the height sides H, such that the protrusion portion 3113 has an L-shaped outline. Therefore, not only is the top of the air cell 310 substantially free from sharp, hard points otherwise caused by welding/sealing, but the capability of arcuate outlines to preclude air cell bending is also enhanced, not to mention that the support provided by the air cell 310 to the lying human body does not decrease despite a reduction of bilateral inflation capacity. The protrusion portion 3113 which has an L-shaped outline is part of the upper connection segment 311.

FIG. 10 illustrates a variant form of the L-shaped outline of the protrusion portion 3113 of FIG. 9. As shown in the diagram, the third connection subsegment of the protrusion portion 3113 is moved down clockwise or counterclockwise to about 30 degrees. The air cell 310 shown in FIG. 10 further reduces the pressure imposed on the two sides of air cell C but does not affect the upward support provided by air cell B to the lying human body.

Figure 11:
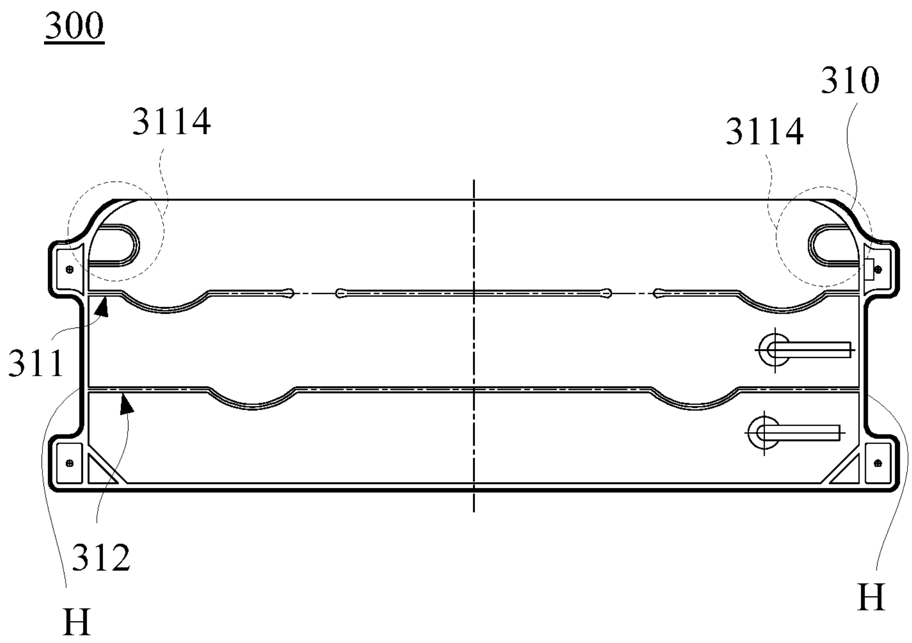
FIG. 11 is a cross-sectional view of the air cell device taken along the long-side direction according to another embodiment of the present disclosure.
Figure 12:
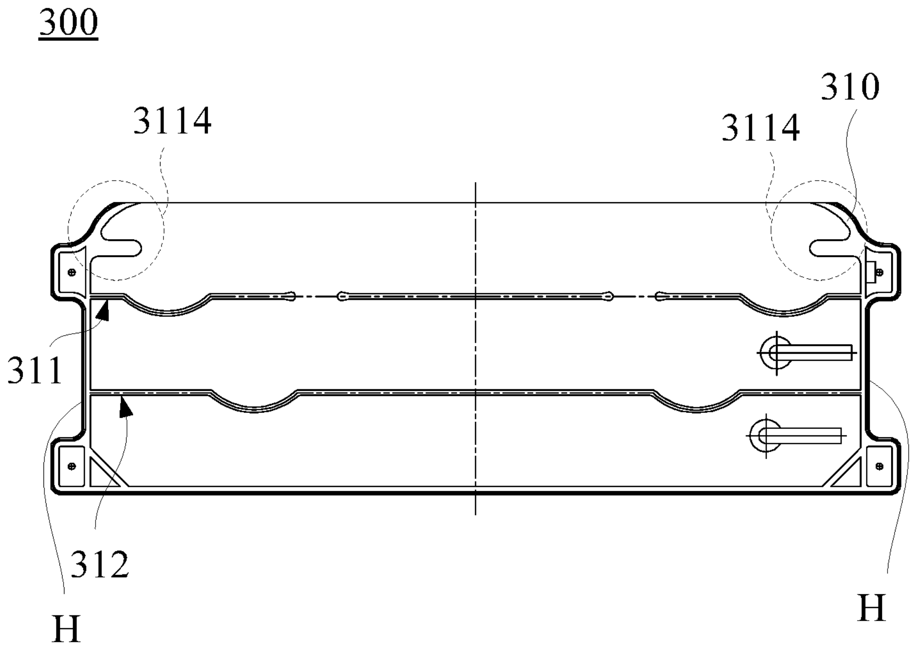
FIG. 12 is a cross-sectional view of the air cell device taken along the long-side direction according to another embodiment of the present disclosure.

As shown in FIGS. 11-12, the air cell 310 has two additional connection segments 3114 formed by joining of the left air cell wall and right air cell wall and connected to the two height sides. The two additional connection segments 3114 are conducive to the reduction in the capacity (for containing air) of the two ends of the uppermost air chamber. The two additional connection segments 3114 are disposed above the upper connection segment 311. The two additional connection segments 3114 are not connected to the upper connection segment 311.

Figure 13:
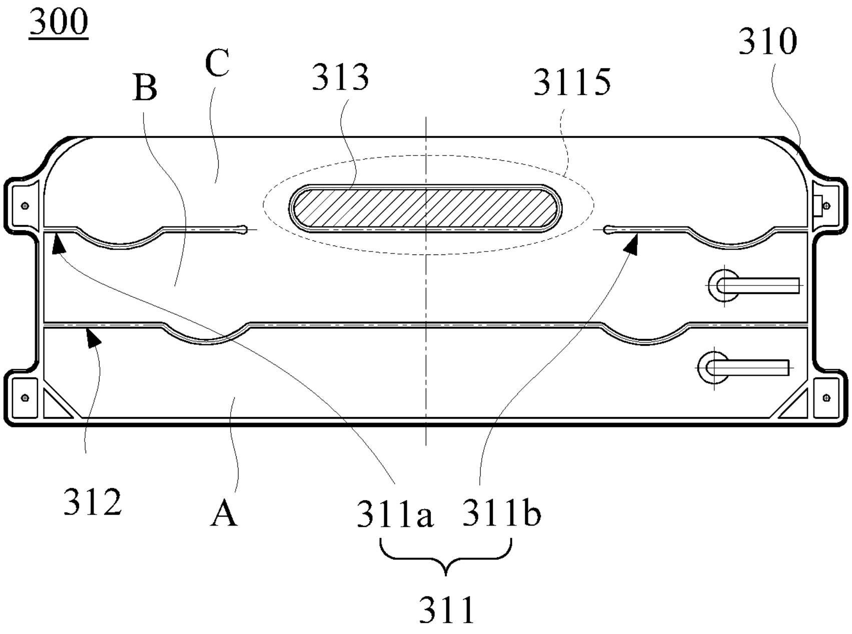
FIG. 13 is a cross-sectional view of the air cell device taken along the long-side direction according to another embodiment of the present disclosure.

As shown in FIG. 13, the upper connection segment 311 has a first upper connection segment 311*a* and a second upper connection segment 311*b*. An structurally-weakened region 3115 formed by the left air cell wall and the right air cell wall not being joined is disposed between the first upper connection segment 311*a* and the second upper connection segment 311*b*. At least one air hollowed-out region 313 formed by the joining of the left air cell wall and the right air cell wall is defined at a part of the structurally-weakened region 3115. For instance, the structurally-weakened region 3115 corresponds in position to the openings, and the structurally-weakened region 3115 interrupts the upper connection segment 311.

The air hollowed-out region 313 is conducive to the elimination of the capacity space at the middle of the air cell; thus, the air hollowed-out region 313 is structurally weaker than the other parts of the air cell. Therefore, the air hollowed-out region 313 is a structurally weakened part of the entire air cell and is intended to provide a buffering force for mitigating the pressure imposed by the middle part of air cell C on a lying human body, especially on the shoulders and neck of a human body lying in the prone position. The air hollowed-out region 313 is of a slender shape (shown in FIG. 13) or is provided in the form of the slender shape (shown in FIG. 13) comprising geometric-shaped blocks arranged in an array. The air hollowed-out region 313 is, for example, formed by joining the air cell walls on the two sides of the air cell 310 by high-frequency welding/sealing or the like, or by directly hollowing out the zone to allow the hollowed-out zone to be enclosed and hermetically sealed inside the air cell 310.

FIG. 14 is a perspective view of the air cell device according to an embodiment of the present disclosure. FIG. 15 is a front view of the air cell device of FIG. 14. FIG. 16 is a rear view of the air cell device of FIG. 14. FIGS. 14~16 depict how the upper connection segment 311 and the lower connection segment 312 look like when the air cell device is inflated. Owing to the upper connection segment 311 and the lower connection segment 312, it is feasible for the left air cell wall 310L and right air cell wall 310R to be joined except at the upper opening 3112. As shown in FIG. 4, a slight depression corresponding in position to the upper opening 3112 occurs to the inflated air cell device 300 because of air cell fabric stretch, but the air chambers which flank the upper connection segment 311 are still in fluidic communication with each other via the upper opening 3112. The curved portions 3111, 3121 cross each other in a direction perpendicular to the long sides of the air cell device 300.

Figure 17:
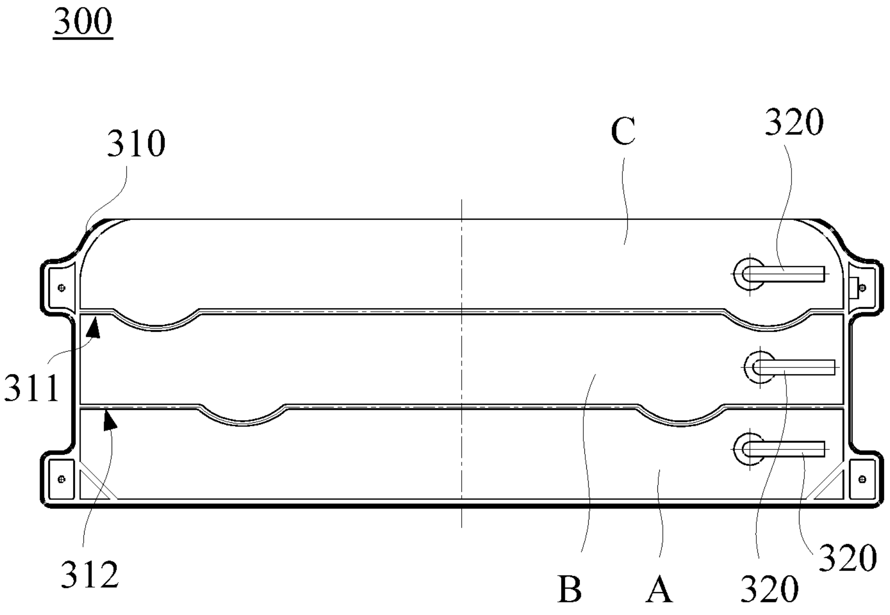
FIG. 17 is a cross-sectional view of the air cell device taken along the long-side direction according to another embodiment of the present disclosure.

As shown in FIG. 17, the connection segments 311, 312 do not have any openings, such that not only are the air chambers (air chambers defined by air cells A, B, C) in the air cell 310 not in fluid communication with each other, but the air chambers are also supplied with air from the air transfer unit 320 in fluid communication with an external air supply device or the like.

Therefore, the air cell device provided according to embodiments of the present disclosure has some advantageous technical features as follows: an upper connection segment and a lower connection segment are formed by joining a left air cell wall and a right air cell wall of an air cell; curved portions are formed on the upper connection segment and the lower connection segment; and thus the air cell device bears a weight evenly. Therefore, the present disclosure is effective in mitigating air cell bending or air cell inversion, thereby improving the lying human being's comfort.

The present disclosure is illustrated by various aspects and embodiments. However, persons skilled in the art understand that the various aspects and embodiments are illustrative rather than restrictive of the scope of the present disclosure. After perusing this specification, persons skilled in the art may come up with other aspects and embodiments without departing from the scope of the present disclosure. All equivalent variations and replacements of the aspects and the embodiments must fall within the scope of the present disclosure. Therefore, the scope of the protection of rights of the present disclosure shall be defined by the appended claims.

What is claimed is:

1. An air cell device, comprising:

an air cell having two long sides, two height sides, and two short sides defined by an air cell wall when the air cell is inflated, the air cell wall having a left air cell wall and a right air cell wall which are defined on two sides of the long sides; and an air transfer unit in fluid communication with an inside of the air cell and an outside of the air cell to transfer air, wherein the air cell has an upper connection segment and a lower connection segment extending along the long side direction, which are formed by directly joining of the left air cell wall and the right air cell wall, allowing inner surfaces of the left and right walls to be in direct contact, the upper and lower connection segments partitioning the inside of the air cell into three chambers extending along the long side direction, wherein the upper connection segment and the lower connection segment each have at least one curved portion by arranging a plurality of positions where the left air cell wall and the right air cell wall to be directly joined, thereby causing the cross-sectional area of each chamber to vary along the long side direction.

2. The air cell device of claim 1, wherein centers of the at least one curved portion on the upper connection segment and the at least one curved portion on the lower connection segment are separated by a horizontal distance in a direction parallel to the long sides.

3. The air cell device of claim 1, wherein the curved portions are raised upward or dented downward by a deviation distance, wherein the deviation distance does not exceed ½ of a height of any one of the air chambers.

4. The air cell device of claim 1, wherein the upper connection segment comprises an upper opening formed by the left air cell wall and the right air cell wall not being joined at part of the upper connection segment, wherein two air chambers adjacent to the upper connection segment can be in fluid communication with each other through the upper opening.

5. The air cell device of claim 4, wherein the lower connection segment comprises a lower opening formed by the left air cell wall and the right air cell wall not being joined at part of the lower connection segment, wherein the three air chambers can be in fluid communication with each other through the upper opening and the lower opening.

6. The air cell device of claim 1, wherein the upper connection segment has a protrusion portion connected to each height side and adapted to decrease the distance between the upper connection segment and the long side at the top of the air cell but increase the distance between the upper connection segment and the lower connection segment.

7. The air cell device of claim 1, wherein the air cell has two additional connection segments formed by joining of the left air cell wall and the right air cell wall, connected to the two height sides, and disposed above the upper connection segment.

8. The air cell device of claim 1, wherein the upper connection segment has a first upper connection segment and a second upper connection segment, and an structurally-weakened region formed by the left air cell wall and the right air cell wall not being joined is disposed between the first upper connection segment and the second upper connection segment, wherein at least one air hollowed-out region formed by the joining of the left air cell wall and the right air cell wall is defined at a part of the structurally-weakened region.

9. An air mattress system, comprising a plurality of air cell devices arranged along the lengthwise direction of the air mattress to at least support a lying human being's head region, shoulder regions, back region, buttock regions, thigh regions and leg regions, wherein the air cell devices each comprise:

an air cell having two long sides, two height sides, and two short sides defined by an air cell wall when the air cell is inflated, the air cell wall having a left air cell wall and a right air cell wall which are defined on two sides of the long sides; and an air transfer unit in fluid communication with an inside of the air cell and an outside of the air cell to transfer air, wherein the air cell has an upper connection segment and a lower connection segment extending along the long side direction, which are formed by directly joining of the left air cell wall and the right air cell wall, allowing inner surfaces of the left and right walls to be in direct contact, the upper and lower connection segments partitioning the inside of the air cell into three chambers extending along the long side direction, wherein the upper connection segment and the lower connection segment each comprise a curved portion asymmetrically positioned, and each of the curved portions is formed by arranging a plurality of positions where the left air cell wall and the right air cell wall to be directly joined, thereby causing the cross-sectional area of each chamber to vary along the long side direction, wherein deflation of part of the air cell devices is controlled to be independent of the other air cell devices.

10. The air mattress system of claim 9, wherein, in the air cell device positioned proximate to the head region and the shoulder regions, the upper connection segment has a first upper connection segment and a second upper connection segment, and an structurally-weakened region formed by the left air cell wall and the right air cell wall not being joined is disposed between the first upper connection segment and the second upper connection segment, wherein at least one air hollowed-out region formed by the joining of the left air cell wall and the right air cell wall is defined at a part of the structurally-weakened region.

11. The air mattress system of claim 9, wherein the length of each said short side is not greater than 6 cm.

* * * * *